US008695527B2

(12) United States Patent
Edmond

(10) Patent No.: US 8,695,527 B2
(45) Date of Patent: Apr. 15, 2014

(54) GLAZING EROSION INDICATOR

(75) Inventor: George Edmond, Yatton (GB)

(73) Assignee: Airbus Operations Limited, Bristol (GB)

(*) Notice: Subject to any disclaimer, the term of this patent is extended or adjusted under 35 U.S.C. 154(b) by 122 days.

(21) Appl. No.: 13/290,287

(22) Filed: Nov. 7, 2011

(65) Prior Publication Data
US 2012/0132129 A1 May 31, 2012

(30) Foreign Application Priority Data

Nov. 30, 2010 (GB) .................................. 1020225

(51) Int. Cl.
*G01D 21/00* (2006.01)
(52) U.S. Cl.
USPC ........................................................ 116/208
(58) Field of Classification Search
USPC ............. 73/86, 762; 116/203, 208; 152/154.2
See application file for complete search history.

(56) References Cited

U.S. PATENT DOCUMENTS

| 2,257,127 | A | | 9/1941 | Roper et al. | |
|---|---|---|---|---|---|
| 3,922,999 | A | | 12/1975 | Meginnis | |
| 5,228,478 | A | * | 7/1993 | Kleisle | 138/104 |
| 5,690,146 | A | | 11/1997 | Stammen | |
| 6,523,586 | B1 | * | 2/2003 | Eromaki et al. | 152/154.2 |
| 2007/0119363 | A1 | * | 5/2007 | Neto et al. | 116/208 |
| 2009/0211421 | A1 | * | 8/2009 | Lier et al. | 83/522.27 |

FOREIGN PATENT DOCUMENTS

| DE | 2632310 | | 1/1978 |
|---|---|---|---|
| WO | 2007-075497 | A2 | 7/2007 |
| WO | 2008134094 | | 11/2008 |

OTHER PUBLICATIONS

Extended European Search Report for Application No. 11187813.8 mailed Apr. 12, 2012.
British Search Report for 1020225.7 dated Mar. 25, 2011.
European Office Action for Application No. 11187813.8 mailed Jun. 19, 2013.

* cited by examiner

*Primary Examiner* — Daniel S Larkin
*Assistant Examiner* — Irving A Campbell
(74) *Attorney, Agent, or Firm* — Lowe Hauptman & Ham, LLP

(57) ABSTRACT

An aircraft glazing component is provided having at least a partially transparent body and a visual wear indicator positioned on or in the body which indicator is configured such that a predetermined amount of erosion on the body changes the appearance of the indicator.

23 Claims, 2 Drawing Sheets

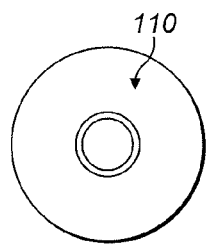
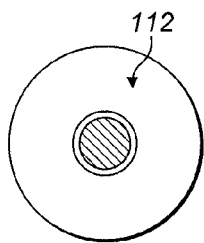
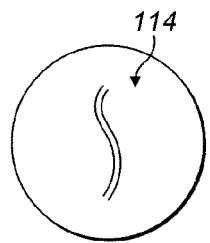
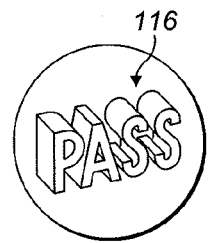
FIG. 3a    FIG. 3b    FIG. 3c    FIG. 3d
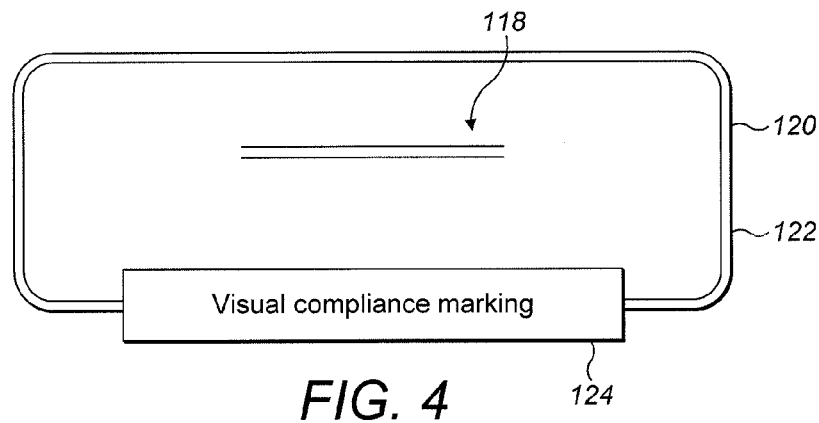
FIG. 4
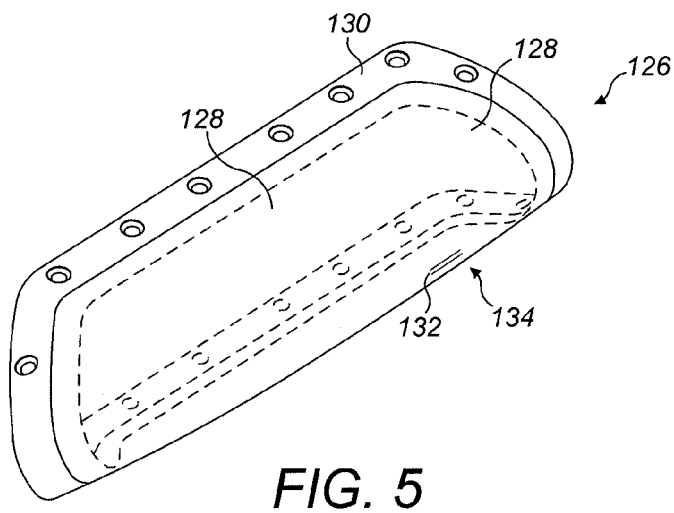
FIG. 5

GLAZING EROSION INDICATOR

RELATED APPLICATIONS

The present application is based on, and claims priority from, British Application Number 1020225.7, filed Nov. 30, 2010, the disclosure of which is hereby incorporated by reference herein in its entirety.

The present invention is concerned with an indicator for visual assessment of erosion of an aircraft light glazing component. In particular, the present invention is concerned with a visual erosion/wear indicator for use on aircraft lighting glazing panels such as on wing strobe lights.

In order to protect the underlying components from the elements and to provide a smooth aerodynamic surface in flight, aircraft lighting systems comprise aerodynamically shaped glazing panels comprising transparent bodies which cover the lamps and associated components. Such lighting systems are installed on the wings and various other surfaces of the aircraft exposed to the external environment during flight.

A problem with such glazing panels is that the impact of particulate matter and water droplets during flight at very high speeds acts to erode the outer surface of the glazing panel and thus detrimentally affect its transparency. This erosion appears as "clouding" or "misting" of the glazing. As this erosive process continues, the glazing unit degrades and must be replaced before it falls below the transparency standard required for various regulations, such as JAR (Joint Aviation Regulation), FAR (Federal Aviation Regulation) and EASA (European Aviation Safety Agency).

At present, the ability of the glazing unit to allow light to pass through is either estimated visually (by the appearance of the erosion) or, alternatively, light levels can be measured at the exterior of the unit using a light meter or similar device. The former method is subjective and therefore inaccurate, whereas the latter method involves the use of specialist equipment.

It is an aim of the present invention to overcome or at least mitigate one or more of the above problems.

According to the present invention there is provided an aircraft light glazing component comprising an at least partially transparent body and a visual wear indicator positioned on or in the body, in which the visual wear indicator is configured such that a predetermined amount of erosion of the body changes the appearance of the visual wear indicator.

By providing a visual wear indicator whose appearance changes upon erosion, a predetermined amount of erosion which is equal to, or slightly less than, the amount permitted by the various regulations can be detected and the glazing unit replaced. By using a visual indicator, simple instructions can be given to ground crew who would not need to use the specialist equipment in order to determine whether the unit requires replacement.

The body comprises an exterior and interior face in use. The visual wear indicator could be positioned on the interior face in which case its appearance will eventually be obscured by the erosion as it occurs.

Alternatively, the wear indicator can be positioned on the exterior face and may be ablative or sacrificial. In this instance the actual existence of the indicator is worn away or eroded. Advantageously, erosion of an ablative wear indicator could also be detected by touch, for example, if it comprises one or more ridges or protrusions extending from the surface of the glazing body.

As a further alternative, the wear indicator could be positioned within the body itself. This would prevent damage to the indicator occurring during installation and service.

The visual wear indicator may comprise a marking which could be applied by a transfer sticker or tape. In this way, the visual indicator can be retro-fitted to existing glazing units. Alternatively, the marking could be directly applied to the body, i.e. printed or painted on.

The visual wear indicator may comprise a mark or region which appears as if the glazing component had been eroded by a pre-determined amount of erosion. Therefore, when the indicator is no longer visible, the predetermined amount of erosion has occurred.

Preferably, the visual wear indicator comprises a first indicator region and a second indicator region spaced apart by a clear region such that erosion blurs or mists the clear region. As such, the two indicator regions eventually become blurred and appear as a single mark which is an indicator that erosion has occurred. The visual wear indicator may comprise two lines offset by a constant distance which may be straight or curved.

Alternatively, the visual wear indicator could comprise text in the form of, for example, the word "pass" which is gradually obscured by erosion until it is no longer visible and the glazing unit thereby fails the test by implication when the word "pass" is not visible.

Preferably, a location indicator is provided proximate the visual wear indicator. Because the visual indicator (by its very nature) is quite difficult to see when erosion has taken place, a location indicator will indicate the exact position of the wear indicator on the glazing unit. Preferably, the location indicator is a border around the visual wear indicator.

Preferably, when installed on the aircraft, the glazing component will have a foremost point and the wear indicator will be positioned on or near that point. This point will be the position of highest wear and, as such, it is desirable to position the wear indicator at the point of highest wear such that the highest amount of erosion can be detected and the part can be replaced.

An example visual wear indicator will now be described with reference to the accompanying drawings in which:—

FIGS. 3a to 3d are example wear indicators;

FIG. 4 is a view of a wear indicator comprising a location indicator; and

FIG. 5 is a view of an alternative glazing component comprising a wear indicator in accordance with the present invention.

Figure 1:
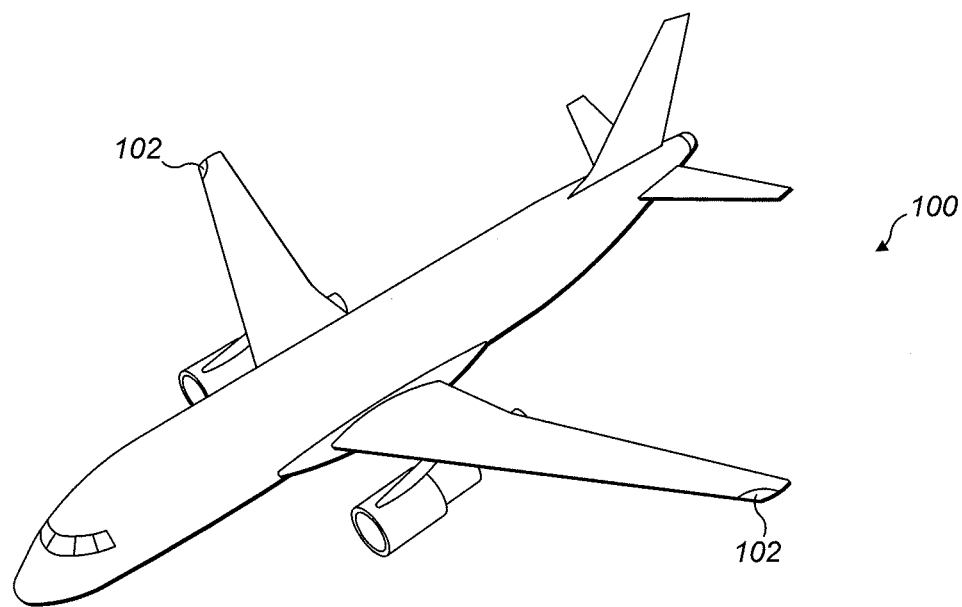
FIG. 1 is a perspective view of an aircraft comprising a wear indicator in accordance with the present invention.

Turning to FIG. 1, there is provided an aircraft 100 comprising forward facing lights 102.

Figure 2:
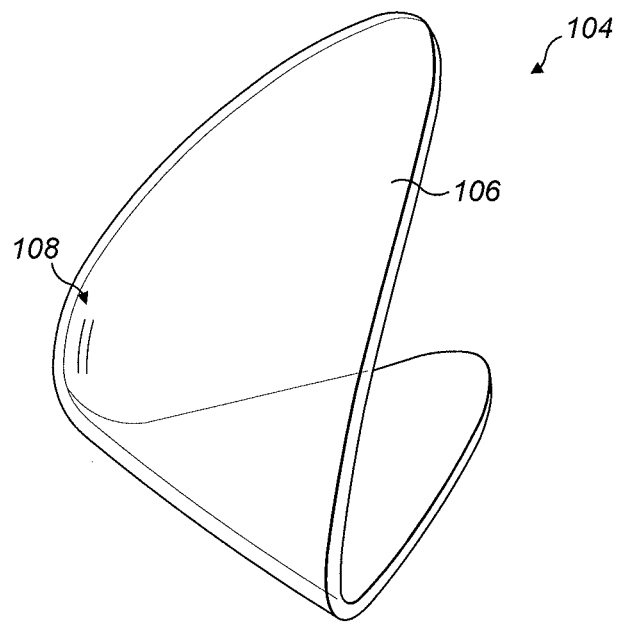
FIG. 2 is a perspective view of an aircraft glazing component comprising a wear indicator in accordance with the present invention.

Turning to FIG. 2, each light comprises a glazing component 104 having a curved body 106 constructed from a transparent material such as polycarbonate. The body 106 is provided with a visual wear indicator 108 provided on an interior face and comprising a pair of parallel, straight offset lines. The wear indicator 108 is positioned on a part of the body which covers a lamp, and not any part which may be backed by mounting formations or backing plates etc. In other words, the indicator is positioned to be in the path of the emitted light of the aircraft light arrangement. The indicator is positioned near the centre of the body 106 so that it is easily visible to ground staff. It will be noted that the wear indicator 108 is positioned near the foremost point of the body 106 in use; i.e. the position of the highest amount of wear and erosion.

By providing two offset parallel straight lines, as erosion occurs, the lines will eventually become blurred. Therefore, the ground crew can be informed that once they cannot distinguish the two lines, erosion has increased to a level at which the glazing component 104 needs to be replaced. Preferably the lines are less than 10 mm apart.

Turning to FIGS. 3a to 3d, there are shown several variations on the visual wear indicator 108. In FIG. 3a, a visual wear indicator 110 is provided comprising two concentric circles, the boundary between which will be blurred as erosion occurs. A similar arrangement is shown in FIG. 3b in which a wear indicator 112 comprises a filled-in circle surrounded by a space circular boundary. An advantage of the wear indicator 112 is that it is more visible in use than the wear indicator 110.

FIG. 3c shows a wear indicator 114 comprising two spaced curved lines which work in a similar fashion to the wear indicator 108. Finally, FIG. 3d shows a wear indicator 116 which comprises text in the form of the word "pass" which gradually becomes obscured as erosion takes place. The text is of a similar shade/texture as eroded glazing. Therefore, once the word "pass" is no longer visible, the component fails the test and should be replaced.

Turning to FIG. 4, there is shown a wear indicator 118 similar to wear indicator 108. The wear indicator 118 is surrounded by a location indicator 120 comprising a border 122 and a label 124. The location indicator 120 is designed so as to be more prominent than the wear indicator 118 such that it is always visible, even when the visual wear indicator 118 itself has become obscured by erosion.

Turning to FIG. 5, a glazing component 126 comprises a transparent part 128 and a metal surround 130. The glazing component 126 comprises a foremost point 132 where the erosion wear indicator 134 is located.

The invention claimed is:

1. An aircraft light glazing component comprising:
   an at least partially transparent body, and,
   a visual wear indicator positioned on or in the body,
   in which the visual wear indicator is configured such that a predetermined amount of erosion of the body changes the appearance of the visual wear indicator, and
   a location indicator proximate the visual wear indicator, which location indicator is more visually prominent than the visual wear indicator so as to be less affected by erosion.

2. An aircraft light glazing component according to claim 1, in which the body comprises an exterior and interior face in use, and the visual wear indicator is positioned on the interior face.

3. An aircraft light glazing component according to claim 1, in which the body comprises an exterior and interior face in use, and the visual wear indicator is positioned on the exterior face.

4. An aircraft light glazing component according to claim 3 in which the visual wear indicator is ablative.

5. An aircraft light glazing component according to claim 1, in which the visual wear indicator is positioned within the body.

6. An aircraft light glazing component according to claim 1 in which the visual wear indicator comprises a formation formed with the body.

7. An aircraft light glazing component according to claim 1 in which the visual wear indicator comprises a marking.

8. An aircraft light glazing component according to claim 7 in which the marking is applied via a transfer, sticker or tape.

9. An aircraft light glazing component according to claim 7 in which the marking is directly applied to the body.

10. An aircraft light glazing component according to claim 1 in which the visual wear indicator comprises a mark or region having, after a predetermined amount of erosion, the appearance of the body.

11. An aircraft light glazing component according to claim 1 in which the visual wear indicator comprises a first indicator region and a second indicator region spaced apart by a clear region such that erosion blurs the clear region.

12. An aircraft light glazing component according to claim 11 in which the visual wear indicator comprises two lines offset by a constant distance.

13. An aircraft light glazing component according to claim 12 in which the lines are straight and parallel.

14. An aircraft light glazing component according to claim 12 in which the lines are curved.

15. An aircraft light glazing component according to claim 1 in which the visual wear indicator comprises text.

16. An aircraft light glazing component according to claim 1 in which the location indicator is a border around the visual wear indicator.

17. An aircraft light glazing component according to claim 1 in which the visual wear indicator is spaced from the edges of the body.

18. An aircraft light glazing component according to claim 17 in which the visual wear indicator is positioned proximate the centre of the body.

19. An aircraft light glazing component according to claim 1 which, when installed on an aircraft, has a foremost point, in which the indicator is positioned on or near the foremost point.

20. An aircraft light glazing component comprising:
   an at least partially transparent body, and,
   a visual wear indicator positioned on or in the body, in which the visual wear indicator is configured such that a predetermined amount of erosion of the body changes the appearance of the visual wear indicator, and in which the visual wear indicator comprises a first indicator region and a second indicator region spaced apart by a clear region such that erosion blurs the clear region.

21. An aircraft light glazing component according to claim 20 in which the visual wear indicator comprises two lines offset by a constant distance.

22. An aircraft light glazing component according to claim 21 in which the lines are straight and parallel.

23. An aircraft light glazing component according to claim 21 in which the lines are curved.

* * * * *